Aug. 31, 1926.

F. B. LOMAX 1,597,911

SIRUP MAKER

Filed April 4, 1923

Witness:

Inventor:
FRANK B. LOMAX

Patented Aug. 31, 1926.

1,597,911

UNITED STATES PATENT OFFICE.

FRANK B. LOMAX, OF CHICAGO, ILLINOIS.

SIRUP MAKER.

Application filed April 4, 1923. Serial No. 629,807.

My invention relates to an improved method of and apparatus for making solutions such as sirup.

Heretofore in the manufacture of sirups and other solutions much time and effort have been consumed in effecting a solution of the ingredients occurring in solid form. Moreover in order to insure a clear solution it was necessary subsequent to the formation of the solution to filter the same.

Now I propose to provide an improved apparatus for and method of manufacturing solutions more expeditiously than heretofore and adapted to filter the solution contemporaneously with its formation.

In general, I provide a solution forming apparatus including a container divided into two compartments by a filtering barrier and a suction device connected to the space below the barrier adapted to create a partial vacuum in said lower space. The barrier in my construction serves both as a filter for the solution and as a support for the solution which is to be dissolved. The vacuum results in the liquid above the barrier being subjected to a pressure difference which causes the liquid to be forced thru the filter. Also some of the solute, which may be sugar, is sucked into the pores of the filter and is rapidly washed away or dissolved by the liquid or solvent being sucked therethru. In other words, I actually employ the suction to augment the rate of solution thus decreasing the period of time required to dissolve a given mass of solid material.

Now in order to prevent the solute from caking on the barrier and interfering with the rate of solution of my device, I provide means for constantly stirring or agitating the liquid and solute above the barrier. This agitating means in causing a circulation of the material above the barrier assists in the dissolving of the solid matter. Thus it will be seen that by employing both the suction and agitating means in a single apparatus in conjunction with a filtering barrier I am enabled to produce a given amount of filtered solution in a great deal less time than heretofore.

Figure 1:
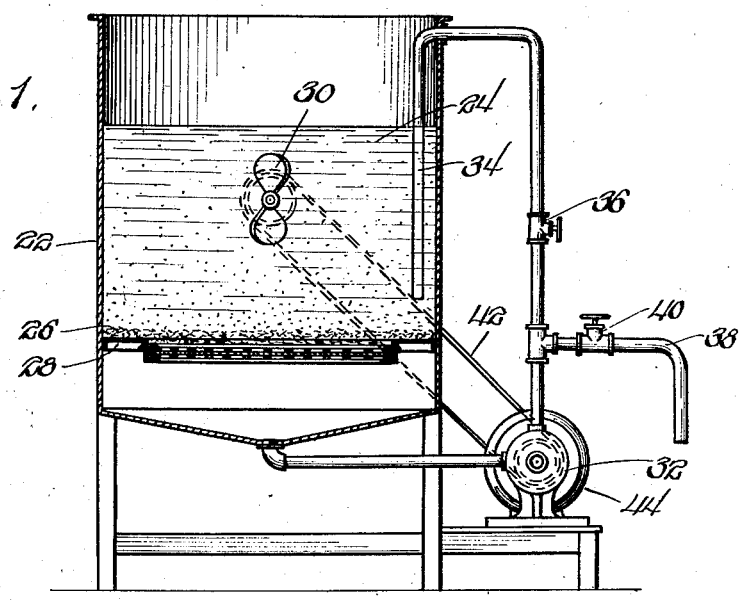
Figure 2:
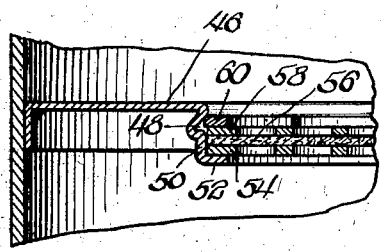

Other objects and advantages of my invention will more fully appear in the following detailed description taken in connection with the accompanying drawing which illustrates one embodiment thereof and in which:

Figure 1 is an elevation partly in section of a filtering and solution forming apparatus embodying the features of my invention; and Fig. 2 is a detail sectional view illustrating the manner of clamping the filtering barrier to the container.

Referring now to the drawing in detail in which like reference numerals will designate similar parts thruout the several views, 22 denotes generally a container divided into two compartments by a diaphragm or barrier 28. Barrier 28, as will be more fully explained hereinafter, comprises means for filtering the solution contemporaneously with its formation. Positioned on the barrier is a mass of solid material or solute which may be sugar and which is to be dissolved. Disposed above the mass of sugar 26 is a liquid or solvent 24 adapted to be drawn downwardly thru the barrier 28.

The lower compartment of the tank 22 is connected to a suction device or pump 32. The discharge orifice of the pump 32 is connected by pipe 34 to the upper part of the tank 22. The pipe 34 is bent so as to extend downwardly into the upper compartment of the tank for the purpose of returning the filtrate thereto. Also the pipe 34 is provided with a shut-off valve 36 and is connected between its ends to a branch pipe 36 controlled by a valve 40. When the solution is completed, by closing the valve 36 and opening the valve 40, the contents of the container or any part thereof may be withdrawn either under the force of gravity or with the assistance of the pump 32 thru the pipe 38.

Connected to the upper part of the tank 22 and extending into the upper compartment thereof is a power driven propeller 30 which may be actuated by means of a belt 42. The agitator or propeller 30 and the pump 32 are preferably actuated from a common shaft (not shown) which is in turn driven by a motor 44.

In Figure 2 I have illustrated in detail the construction of the barrier 28 which includes an annular ring 46 suitably connected to the wall of the container 22. The ring is cupped downwardly to form a groove 48 followed by a cylindrical portion 50 terminating in an inturned lip 52. Resting on this lip 52 is a foraminated plate 54 upon which is disposed a layer of filtering matter 56. Located on top of the layer 56 is a second or top foraminated plate 58. Both of said plates and the intermediate layer 56 are clamped in place by means of a split ring 60 extending into groove 48.

It is believed that my novel method of forming a solution will be understood from the following description of the operation of my novel apparatus:

First, the solid matter 26 to be dissolved and the liquid 24 are placed in the upper compartment of the container 22. Then the motor is actuated causing the pump 32 to become effective to pump liquid thru the mass of solute 26 and the barrier 28. Pump 32, as is obvious from the drawing, serves to return the filtrate to the upper compartment of the tank 22 thru the bent pipe line 34. It should be noted that the partition 28 serves both as a support for the mass of solute upon which a suction is imposed as well as a filter for the solution being formed. In other words, the filtering barrier 28 contemporaneously filters the solution as it is formed. Furthermore, the protection of the pump is absolutely necessary in order to permit the continuous operation of the dissolving mechanism. Oftentimes in using sugar for barrels, nails, pieces of wood, paper and other foreign matter are apt to be fed into the mixing chamber, or in the case of bags, pieces of string may get into the tank. If it was not for the filter, this foreign matter would bind or seriously damage the pump making it inoperative and thereby stopping the circulation of the liquid.

The pump creates a partial vacuum in the lower compartment of the tank 22 causing the liquid above the barrier to be subjected to a pressure difference which causes the liquid to be forced thru the filter. Also a certain amount of the solute is sucked into the pores of the filter and is rapidly washed away or dissolved by the liquid or solvent being sucked therethru. This results in an actual increase in the rate of solution.

Now when there is a relatively large mass of solute 26 on top of the barrier 28, there is a tendency for the same to cake due to the effect of the suction thereon. The liquid discharged into the upper compartment by the pipe 34 tends to a certain degree to stir up the liquid and solute in the tank above the filtering barrier. However, in order to increase this agitation, I provide the agitator 30 which constantly stirs up the matter above the barrier preventing the solute from caking thereon. Then too, this agitator in causing a circulation of the material above the barrier assists in the dissolving of the solid matter. By running the agitator and the pump from a common source of power, namely the motor 44, a very economical construction is created.

From the foregoing, it will be evident that by employing both the suction and agitating means in a simple apparatus in connection with the filtering barrier I am enabled to produce a given amount of filtered solution in a great deal less time than has heretofore been possible. The filtering barrier 28 not only serves as a support for the solute but also serves as a means for removing precipitate from the liquid being circulated such, for example, as coloring matter.

I desire it understood that altho I have illustrated and described in detail the preferred embodiment of my invention, the invention is not to be limited thereby but only in so far as defined by the scope and spirit of the appended claims.

I claim:—

1. In combination, a pair of juxtaposed compartments, the bottom of the upper compartment forming a partition between the two compartments, the upper compartment being adapted to hold a solute and a solvent, the solute resting on the said partition, means for drawing the solvent through the solute to form a solution and for drawing the resolving solution through the partition into the lower compartment and circulating it back to the upper compartment, the said partition being adapted to filter the solution as it is drawn therethrough and being composed of an annular ring, a filter covering the hole in the said ring, and foraminated plates clamped on opposite sides of said filter to reinforce and hold it in place, and means for agitating the material in the upper compartment.

2. In combination, a pair of juxtaposed compartments, the bottom of one of the compartments forming a partition between the two compartments, said partition comprising an annular ring, a filter covering the hole in said ring, and foraminated plates clamped on opposite sides of the said filter to reenforce and hold it in place, the upper compartment holding a solute and a solvent, the solute resting on the said partition, a pump and connections for drawing the solvent in the upper compartment through the said solute to form a solution and for drawing the solution through the said partition into the lower compartment, and returning it to said upper compartment, discharge means branching off the connections associated with the pump for enabling the withdrawal of the solution at predetermined times, agitating means in said first compartment, and means for operating both the pump and the agitating means.

3. The method of forming a solution which consists in agitating a liquid and subjecting a mass of solute to a suction to cause the said liquid to be sucked therethrough.

4. The method of forming a solution which consists in agitating a liquid, subjecting a mass of solute to a suction to cause the liquid to dissolve its way through the solute, and circulating the resultant liquid back to the undissolved mass of solute.

5. The method of forming a filtered solution which consists in agitating a liquid, subjecting a mass of solute to a suction to suck the said liquid through the said solute, to suck the resultant solution through a filter, and to circulate the filtered solution back to the said mass of solute, and at predetermined times diverting the filtered solution from the path in which it is being circulated.

6. The method of forming a solution which consists in placing a solute upon a barrier, creating a partial vacuum below the barrier to subject the solute to a suction and thus cause a liquid to be sucked therethrough, and agitating the solute on the barrier to hasten the dissolving action and to prevent the solute from caking on the barrier.

7. The method of forming a filtered solution which consists in agitating a liquid, and subjecting a mass of solute resting on a filter to a suction to suck the said liquid through the said solute and through the filter.

8. The method of forming a filtered solution from a mass of solute and liquid disposed above a filter which consists in agitating the solute to prevent it from caking on the filter, and subjecting the filter to a suction to cause the liquid to be sucked through the solute and through the filter.

9. The method of forming a filtered solution from a mass of solute and liquid disposed above a filter which consists in agitating the liquid to prevent the solute from caking on the filter and contemporaneously subjecting the mass of solute to a suction to cause the liquid to be sucked therethrough and through the filter.

10. In combination, a pair of juxtaposed compartments, a partition for separating the compartments comprising a filtering barrier, agitating means disposed in the upper compartment immediately over the barrier adapted to prevent solute from caking on the barrier, and suction means associated with the other compartment adapted to subject the filtering barrier to a suction to cause liquid to be sucked through said solute.

11. In combination, a pair of juxtaposed compartments, a partition for separating the compartments comprising a filtering barrier including a filter disposed intermediate a pair of clamping elements which reenforce and hold the filter in place, and suction means connected to one of the compartments to create a partial vacuum in the said compartment and to thus subject the filtering barrier to a suction.

12. In combination, a pair of juxtaposed compartments, a partition for separating the compartments comprising a filtering barrier, agitating means disposed in the upper compartment immediately over the barrier adapted to prevent solute from caking on the barrier, and suction means associated with the other compartment for creating a partial vacuum therein to subject the barrier to a suction and cause liquid to be sucked through said solute and barrier, said suction means being adapted to circulate the filtered solution back to the said upper compartment.

In witness whereof, I hereunto subscribe my name this 31st day of March, 1923.

FRANK B. LOMAX.